(12) United States Patent
Bregman et al.

(10) Patent No.: US 12,038,828 B2
(45) Date of Patent: Jul. 16, 2024

(54) DISTRIBUTED DEBUGGING ENVIRONMENT FOR A CONTINUOUS INTEGRATION PIPELINE

(71) Applicant: RED HAT, INC., Raleigh, NC (US)

(72) Inventors: Arie Bregman, Gan-Yavne (IL); Nir Magnezi, Petah Tivka (IL)

(73) Assignee: Red Hat, Inc., Raleigh, NC (US)

( * ) Notice: Subject to any disclaimer, the term of this patent is extended or adjusted under 35 U.S.C. 154(b) by 150 days.

(21) Appl. No.: 17/888,713

(22) Filed: Aug. 16, 2022

(65) Prior Publication Data
US 2024/0061765 A1  Feb. 22, 2024

(51) Int. Cl.
*G06F 9/44* (2018.01)
*G06F 11/36* (2006.01)

(52) U.S. Cl.
CPC ...... *G06F 11/3664* (2013.01); *G06F 11/3688* (2013.01); *G06F 11/3696* (2013.01)

(58) Field of Classification Search
None
See application file for complete search history.

(56) References Cited

U.S. PATENT DOCUMENTS

| | | | |
|---|---|---|---|
| 8,533,676 B2 | 9/2013 | Watters et al. | |
| 10,198,344 B2 | 2/2019 | Vyas et al. | |
| 10,402,302 B1* | 9/2019 | Ramraz | G06F 11/368 |
| 10,528,458 B2 | 1/2020 | Brafman et al. | |
| 10,678,677 B1* | 6/2020 | Kuris | G06F 11/3624 |
| 2018/0267884 A1* | 9/2018 | Dhanda | G06F 11/3688 |
| 2020/0110693 A1* | 4/2020 | Herrin | G06F 8/355 |
| 2023/0098474 A1* | 3/2023 | Bonic | G06F 17/18 714/38.1 |

OTHER PUBLICATIONS

CN113297081, English text (Year: 2021).*
CN-110704082, English text (Year: 2020).*
Cn-114115975, English text (Year: 2022).*
Hassan, Foyzul "Tackling Build Failures In Continuous Integration," Dept. of Computer Science, The Univ. of Texas at San Antonio, May 2020; pp. 1-173.
"Building a CI/CD Pipeline [Guide]," https://revdebug.com/blog/how-to-build-the-ci-cd-pipeline-of-the-future-using-the-devops-tools-of today/, May 21, 2019; pp. 1-10.

* cited by examiner

*Primary Examiner* — Insun Kang
(74) *Attorney, Agent, or Firm* — Kilpatrick Townsend & Stockton LLP

(57) ABSTRACT

Some examples of the present disclosure relate to generating a distributed debugging environment for a continuous integration (CI) pipeline. For example, a system can detect a failure of a CI pipeline in relation to a code submission for a software project, the CI pipeline being performed in a distributed CI environment including CI nodes. The system can determine a configuration of the distributed CI environment in response to detecting the failure. The system can generate a distributed debugging environment based on the configuration of the distributed CI environment, the distributed debugging environment including debugging nodes that are separate from the CI nodes. The system can modify a configuration setting of the distributed debugging environment for use in determining a source of the failure of the CI pipeline with respect to the code submission.

20 Claims, 3 Drawing Sheets

DISTRIBUTED DEBUGGING ENVIRONMENT FOR A CONTINUOUS INTEGRATION PIPELINE

TECHNICAL FIELD

The present disclosure relates generally to continuous integration during software development. More specifically, but not by way of limitation, this disclosure relates to generating a distributed debugging environment for a continuous integration pipeline.

BACKGROUND

Continuous integration is the process of merging developers' working copies of source code into a shared mainline code-base at frequent intervals, such as multiple times a day. Continuous integration is implemented using continuous integration tools, such as Jenkins, Buildbot, or Travis CI. Developers can submit source code at periodic intervals to the continuous integration tool, which can implement a continuous integration pipeline that attempts to produce a build from the source code. A build is executable code that has been successfully created and tested for a piece of software, such as a software application. Generally, the continuous integration pipeline includes multiple phases that are executed in a sequential order. The continuous integration pipeline can begin with a compilation phase in which the source code is compiled into artifacts. Artifacts are executable code that has been compiled from source code for testing. The continuous integration pipeline can then perform a testing phase in which various types of tests (e.g., integration tests, acceptance tests, and unit tests) are executed on the artifacts. The testing phase can enable the developers to rapidly detect defects in the source code, so that they can be corrected as soon as possible.

DETAILED DESCRIPTION

Figure 1:
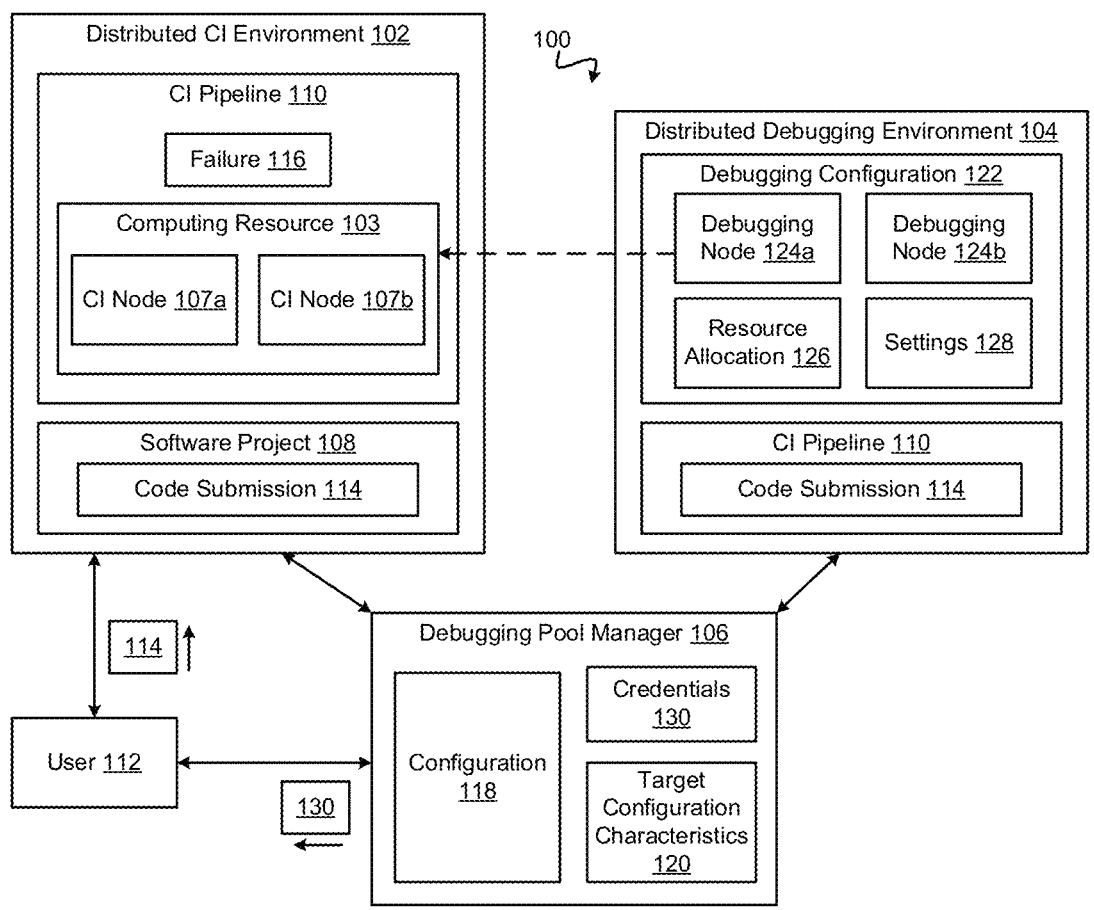
FIG. 1 is a block diagram of an example of a system including a distributed debugging environment generated for a continuous integration pipeline according to some aspects of the present disclosure.

Distributed continuous integration environments can execute continuous integration (CI) pipelines using multiple networked nodes, such as virtual machines, containers, or bare metal servers. The nodes used to implement a continuous integration pipeline can be referred to as CI nodes. The number of CI nodes can be finite and can depend on an amount of computing resources that are available in the distributed CI environment. Typically, each CI node may be in use relatively continuously, executing queues of tasks that are key to the functioning of the CI pipeline. As code submissions are tested using the CI pipeline, failures associated with the code submissions may arise. For example, a code submission may undergo a series of tests that leads to an error in the functioning of the CI pipeline. It may be challenging to perform debugging processes on the CI nodes to determine a source of a failure, because such debugging processes can detract from the other, more important uses of the CI nodes. For example, using the CI nodes to perform debugging processes can prevent the CI nodes from executing their primary tasks, which may increase latency or otherwise negatively impact the functioning of the distributed CI environment. While logs and artifacts produced by the CI pipeline during the software build may provide insight to the source of the failure, this can fall short of a true interactive debugging environment. And while some developers may try to rerun the CI pipeline on their local machine in an to attempt to recreate and debug the failure, this is often a suboptimal situation because the operating systems, computing resources, and other environment variables in the distributed CI environment may vary significantly from those of the local machine. These differences can make it difficult or impossible to debug the failure.

Some examples of the present disclosure can overcome one or more of the abovementioned problems by detecting a failure of a CI pipeline in relation to a code submission and automatically generating a distributed debugging environment that mimics the distributed CI environment that executed the CI pipeline. The distributed debugging environment can be separate from the distributed CI environment. For example, the distributed debugging environment can be executed on debugging nodes that are different from the CI nodes in the distributed CI environment. The debugging nodes may be reserved for these debugging tasks and may not be used to execute other tasks, such as those for running the CI pipeline in the distributed CI environment. By generating a separate distributed debugging environment, debugging of the failure can be performed without increasing latency or negatively impacting the performance of the distributed CI environment. Reproducing the distributed CI environment at the time of the failure in the distributed debugging environment may allow for more robust testing of the CI pipeline, because the distributed debugging environment may account for non-trivial characteristics of the distributed CI environment that may not be reproducible on a developer environment using a developer's local machine. For example, the distributed debugging environment may more closely mimic the operating systems, file dependencies, load, network topology, and other configurations or settings of the distributed CI environment than may be possible with a developer's local machine.

In one particular example, a user can submit a code submission for a software project to a distributed CI environment. The distributed CI environment can execute one or more CI nodes to run a CI pipeline that can attempt to create a build of the software project. During the execution of the CI pipeline, the CI nodes can experience a failure. For example, the CI nodes may timeout while attempting to build the software project. As another example, after producing a build, the CI nodes may execute a testing phase for the build that may fail. In response to detection of the failure, a distributed debugging environment can be automatically generated and configured to mimic one or more aspects of the distributed CI environment. The debugging environment can be used to reproduce the failure on debugging nodes that are separate from the CI nodes.

More specifically, after the failure is detected, a configuration of the CI nodes can be determined. The configuration can include characteristics of the distributed CI environment at the time of the failure, such as the number and type of CI nodes, their operating systems, software packages and dependencies, and hardware characteristics, etc. The distributed debugging environment can be configured to have a same or similar configuration to the distributed CI environment. Additionally, one or more users can be automatically notified of the failure. The users can also be transmitted secure credentials (e.g., usernames and passwords) for accessing the distributed debugging environment. The distributed debugging environment can run the CI pipeline using the debugging nodes to test the code submission in the distributed debugging environment in an effort to reproduce the failure. Users can interact with the distributed debugging environment as a test environment for determining a source of the failure.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 including a distributed debugging environment 104 generated for a continuous integration (CI) pipeline 110 according to some aspects of the present disclosure. Components within the system 100 may be communicatively coupled via a network, such as a local area network (LAN), wide area network (WAN), the Internet, or any combination of these.

The system 100 includes one or more users 112. The users 112 may interact with the distributed CI environment 102 via computing devices (e.g., desktop computers, laptop computers, mobile devices, or servers) on which the users 112 can submit code submissions 114 for a software project 108 to the distributed CI environment 102. A CI pipeline 110 can perform a build of the software project 108 in the distributed CI environment 102, which can include one or more CI nodes 107a-b for running the CI pipeline 110. The CI nodes 107a-b can be virtual nodes or physical nodes. Examples of a virtual node can include a processing thread, virtual machine, or container (e.g., an isolated set of computing resources allocated for a particular purpose). Examples of a physical node can include a server or a desktop computer.

The system 100 further includes a debugging pool manager 106 that can monitor the distributed CI environment 102 to detect a failure 116 of the CI pipeline 110. For example, after receiving the code submission 114 from the user 112 for updating the software project 108, the CI pipeline 110 can attempt to produce a build of the software project 108. In some examples, the debugging pool manager 106 can periodically check the distributed CI environment 102 to determine if a failure 116 has occurred. In other examples, the debugging pool manager 106 can be notified if the CI pipeline 110 fails to produce a build of the software project 108, or if the build fails a test. In response to detecting a failure 116, the debugging pool manager 106 can determine a configuration 118 of the distributed CI environment 102. The configuration 118 can be a profile of the distributed CI environment 102 at the time of the failure 116. For example, the configuration 118 can include disk snapshots of the CI nodes 107a-b, operating systems, processor characteristics, memory characteristics, storage characteristics, network characteristics, software characteristics, or any other settings or configurations of the distributed CI environment 102.

In some examples, the debugging pool manager 106 can additionally identify users associated with the failure 116. For example, the debugging pool manager 106 may determine that the failure 116 may be associated with the code submission 114 submitted by the user 112. Additionally or alternatively, the debugging pool manager 106 may identify users that submitted or tested a portion of the software project 108 that is affected by the failure 116. The debugging pool manager 106 can notify identified users 112 of the failure 116.

The debugging pool manager 106 can generate a distributed debugging environment 104 based on the configuration 118 of the distributed CI environment 102. The distributed debugging environment 104 can include one or more debugging nodes 124a-b that are separate from the CI nodes 107a-b for the distributed CI environment 102. In some examples, the debugging nodes 124a-b may have different characteristics than the CI nodes 107a-b. For example, the number of CI nodes 107a-b may be greater than the number of debugging nodes 124a-b. In another example, the debugging nodes 124a-b may have less computing power than the CI nodes 107a-b. For example, the CI nodes 107a-b may have a greater amount of memory or processing power than the debugging nodes 124a-b.

Because of differences between the CI nodes 107a-b and the debugging nodes 124a-b, it may not be possible for distributed debugging environment 104 to be configured so that it exactly matches the configuration 118 of the distributed CI environment 102, but it can be made to match the configuration 118 of the distributed CI environment 102 as closely as possible. For example, the debugging pool manager 106 can determine target configuration characteristics 120 for the distributed debugging environment 104 based on the configuration 118 of the distributed CI environment 102, taking into account any limitations of the debugging nodes 124a-b. The target configuration characteristics 120 may be selected to mimic the configuration 118 as closely as possible. For example, the debugging pool manager 106 may determine that the target configuration characteristics 120 for the distributed debugging environment 104 are to include the same operating system, disk contents, network topology, and software configuration as the distributed CI environment 102. But if the debugging nodes 124a-b do not have the same processing power as the CI nodes 107a-b, for example because the debugging nodes 124a-b have less CPU cores than are used by the CI nodes 107a-b, the debugging pool manager 106 can take this into account. For instance, the debugging pool manager 106 can select the target configuration characteristics 120 so that the debugging nodes 124a-b executes all of its CPU cores, to get as close as possible to the processing power of the distributed CI environment 102.

After determining the target configuration characteristics 120, the debugging pool manager 106 can configure the distributed debugging environment 104 to mimic the distributed CI environment 102 as closely as possible. For example, the debugging pool manager 106 can interact with the distributed debugging environment 104 to apply the target configuration characteristics 120 to the distributed debugging environment 104. The characteristics of the distributed debugging environment 104 can be referred to herein as the debugging configuration. Thus, the debugging pool manager 106 can interact with the distributed debugging environment 104 to modify one or more settings 128 of the debugging configuration 122 so that they match the target configuration characteristics 120. Modifying the settings 128 can include modifying the resource allocation 126 (e.g., the allocation of computing resources) in the distributed debugging environment 104. For example, the debugging pool manager 106 can interact with the distributed debugging environment 104 to modify its allocation of processing power and memory among the debugging nodes 124a-b, so as to more closely match the allocation of processing power and memory among the CI nodes 107a-b.

In some examples, the distributed debugging environment 104 may be secured via encrypted connections. The debugging pool manager 106 may dynamically generate credentials 130 that can allow the user 112 to securely access the distributed debugging environment 104. In one example, the credentials 130 can be Secure Shell keys generated by the debugging pool manager 106 and transmitted to the user 112. In other examples, the user 112 may access the distributed debugging environment 104 using preset authentication. The debugging pool manager 106 may transmit the credentials 130 to the user 112 that submitted the code submission 114. Additionally or alternatively, the debugging pool manager 106 may transmit the credentials 130 to any users identified as being associated with the failure 116 of the CI pipeline 110. In some examples, the debugging pool manager 106 may transmit the credentials 130 to a predetermined list of users in response to detecting the failure 116. The user 112 may use the credentials 130 to create an encrypted connection to the distributed debugging environment 104 and to use the distributed debugging environment 104 to determine a source of the failure 116. Additionally, the debugging pool manager 106 can transmit differences between the configuration 118 of the distributed CI environment 102 and the target configuration characteristics 120 to the user 112. For example, if the debugging configuration 122 has less memory than the configuration 118 of the distributed CI environment 102, the debugging pool manager 106 can transmit a notification of the difference in memory to the user 112.

Once the distributed debugging environment 104 has been properly configured based on the configuration 118 of the distributed CI environment 102, the CI pipeline 110 can be run again on the distributed debugging environment 104 to test the code submission 114 in the distributed debugging environment 104. The debugging pool manager 106 can determine if the failure 116 has been reproduced in the distributed debugging environment 104. If the failure 116 has not been reproduced, the debugging pool manager 106 can further modify the debugging configuration 122, to the extent possible, to better mimic the configuration 118 of the distributed CI environment 102. In some examples, the debugging pool manager 106 can identify tests that were run in the CI pipeline 110 of the distributed CI environment 102 in relation to the code submission 114. The distributed debugging environment 104 may then be configured to automatically rerun the same tests.

Any user 112 that has received credentials 130 may access and interact with the distributed debugging environment 104 to determine a source of the failure 116. In some examples, the source of the failure 116 in the distributed CI environment may be a constraint on a computing resource 103 in the distributed CI environment 102. For example, the source of the failure 116 may be due to a lack of processing power for the CI nodes 107a-b. The debugging pool manager 106 may determine that the source of the failure 116 is such a constraint (e.g., automatically or based on input from a user 112) and take automated steps to resolve the problem. For example, the debugging pool manager 106 can reallocate a debugging node 124a from the distributed debugging environment 104 to the distributed CI environment 102, so that the debugging node 124a becomes part of the CI node pool. This can increase an amount of the computing resources 103 that are available in the distributed CI environment 102, which may prevent a subsequent failure of the CI pipeline 110.

While FIG. 1 depicts a specific arrangement of components, other examples can include more components, fewer components, different components, or a different arrangement of the components shown in FIG. 1. For instance, in other examples the debugging pool manager 106 may be located inside the distributed CI environment or the distributed debugging environment 104. Additionally, any component or combination of components depicted in FIG. 1 can be used to implement the process(es) described herein.

Figure 2:
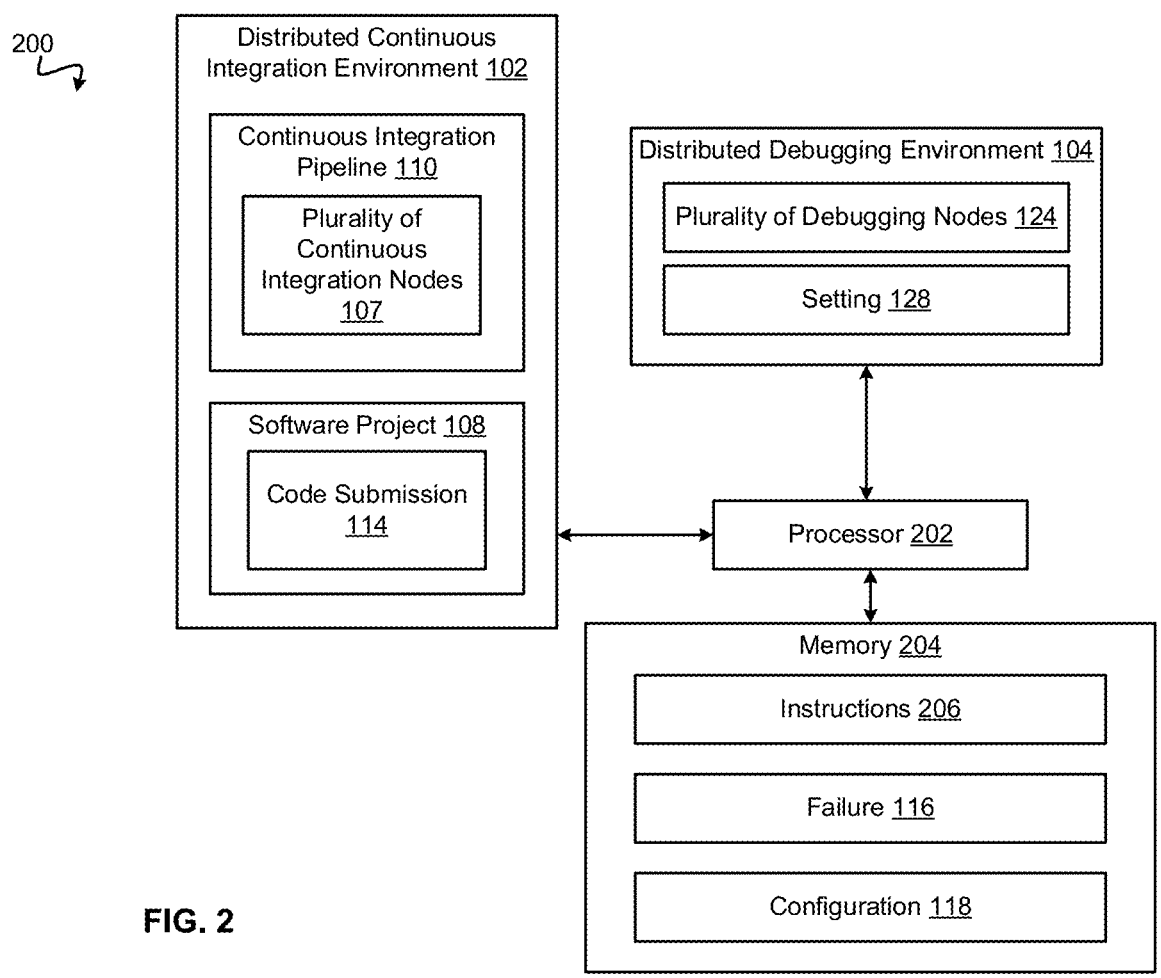
FIG. 2 is a block diagram of another example of a system including a distributed debugging environment generated for a continuous integration pipeline according to some aspects of the present disclosure.

FIG. 2 is a block diagram of another example of a system 200 including a distributed debugging environment 104 generated for a continuous integration (CI) pipeline 110 according to some aspects of the present disclosure. The system 200 includes a processor 202 communicatively coupled with a memory 204.

The processor 202 can include one processor or multiple processors. Non-limiting examples of the processor 202 include a Field-Programmable Gate Array (FPGA), an application-specific integrated circuit (ASIC), and a microprocessor. The processor 202 can execute instructions 206 stored in the memory 204 to perform operations. In some examples, the instructions 206 can include processor-specific instructions generated by a compiler or an interpreter from code written in any suitable computer-programming language, such as C, C++, C #, Java, Python, or any combination of these.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 includes a non-transitory computer-readable medium from which the processor 202 can read instructions 206. A computer-readable medium can include electronic, optical, magnetic, or other storage devices capable of providing the processor 202 with the instructions 206 or other program code. Non-limiting examples of a computer-readable medium include magnetic disk(s), memory chip(s), ROM, random-access memory (RAM), an ASIC, a configured processor, and optical storage.

In some examples, the processor 202 can detect a failure 116 of a CI pipeline 110 in relation to a code submission 114 for a software project 108. The CI pipeline 110 can be performed in a distributed CI environment 102 that includes a plurality of CI nodes 107. In response to detecting the failure 116, the processor 202 can determine a configuration 118 of the distributed CI environment 102. The processor 202 can generate a distributed debugging environment 104 based on the configuration 118 of the distributed CI environment 102. The distributed debugging environment 104 can include a plurality of debugging nodes 124 that are separate from the plurality of CI nodes 107. Generating the distributed debugging environment 104 based on the configuration 118 can involve deploying, allocating, and/or configuring the plurality of debugging nodes 124 based on the configuration 118 of the distributed CI environment 102. In some examples, the processor 202 can also modify a setting 128 of the distributed debugging environment 104 for use in determining a source of the failure 116 with respect to the code submission 114. For example, the processor 202 can automatically and iteratively modify (e.g., randomly or accordingly to a predefined algorithm) one or more settings 128 of the distributed debugging environment 104 until the same failure 116 is reproduced in the distributed debugging environment 104. This can facilitate the debugging process.

Figure 3:
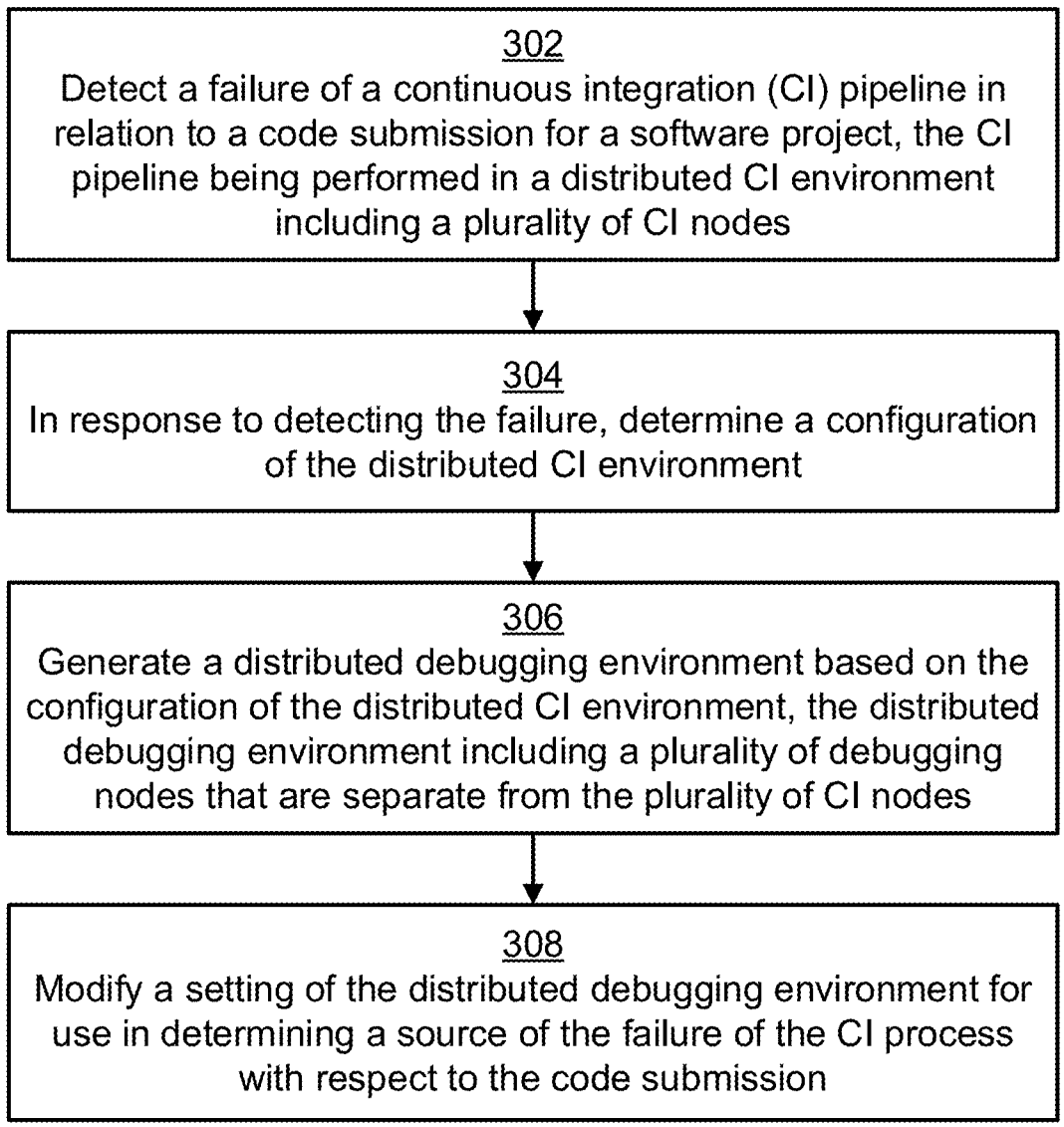
FIG. 3 is a flow chart of an example of a process for generating a distributed debugging environment for a continuous integration pipeline according to some aspects of the present disclosure.

In some examples, the processor 202 can perform one or more of the steps shown in FIG. 3. In other examples, the processor 202 can implement more steps, fewer steps, different steps, or a different order of the steps depicted in FIG. 3. The steps of FIG. 3 are described below with reference to components discussed above in FIGS. 1-2.

At block 302, the processor 202 detects a failure 116 of the CI pipeline 110 in relation to a code submission 114 for a software project 108, the CI pipeline 110 being performed in a distributed CI environment 102 including a plurality of CI nodes 107. For example, the processor 202 can detect that the CI pipeline 110 failed to create a build of the software project 108 after the software project 108 was updated to include the code submission 114. In another example, the processor 202 can detect that a test run in the CI pipeline 110 during a testing phase associated with the code submission 114 has failed. In some examples, the processor 202 may check the CI pipeline 110 for failures 116 at predefined intervals, such as once per hour or once per day.

At block 304, in response to detecting the failure 116, the processor 202 determines a configuration 118 of the distributed CI environment 102. The processor 202 may determine the configuration 118 of the entire distributed CI environment 102, not just of a particular CI node 107 associated with the failure 116. To determine the configuration 118 of the distributed CI environment 102, the processor 202 can take disk snapshots of the plurality of CI nodes 107 at the time of the detected failure 116. In one example, the processor 202 can use Checkpoint/Restore In Userspace (CRIU) to freeze the CI pipeline 110 and checkpoint it to persistent storage as a collection of files. Additionally, the processor 202 can capture other properties of the plurality of CI nodes 107 at the time of the detected failure 116, such as the number and arrangement of nodes 107, CPUs, memory, network interface controllers (NICs), and/or graphics processing units (GPUs) in use.

At block 306, the processor 202 generates a distributed debugging environment 104 based on the configuration 118 of the distributed CI environment 102. The distributed debugging environment 104 can include a plurality of debugging nodes 124a-b that are separate from the plurality of CI nodes 107. The plurality of debugging nodes 124a-b may be dedicated to running copies of CI pipelines for debugging purposes, rather than the CI pipelines being rerun in the distributed CI environment 102. In some examples, the plurality of CI nodes 107 may have a first computing power that is greater than a second computing power of the plurality of debugging nodes 124a-b. For example, the plurality of CI nodes 107 may have more CPU cores or RAM than the plurality of debugging nodes 124a-b.

The processor 202 can generate the distributed debugging environment 104 based on the configuration 118 by determining target configuration characteristics 120 for the plurality of debugging nodes 124a-b. The target configuration characteristics 120 can be the same as or similar to the configuration 118 of the distributed CI environment 102. If it is not possible for the target configuration characteristics 120 to be exactly the same as the configuration 118, the processor 202 can determine target configuration characteristics 120 with minimal differences from the configuration 118. For example, the configuration 118 of the distributed CI environment 102 may include the use of a first operating system, which may not be available or usable on the debugging nodes 124a-b. So, the processor 202 can determine that target configuration characteristics 120 are to include a second operating system that is usable on the debugging nodes 124a-b to run the CI pipeline 110. The second operating system may be selected to be as close as possible to the first operating system. For example, the second operating system may be selected because it is of a same class (e.g., Linux) or type (e.g., Red Hat Enterprise Linux) as the first operating system. There still may be differences between the two operating systems, for example if they are different versions (e.g., v1.0 versus v1.2) than one another, but those differences may not materially impact the debugging process in some situations.

At block 308, the processor 202 modifies a setting 128 of the distributed debugging environment 104 for use in determining a source of the failure 116 of the CI pipeline 110 with respect to the code submission 114. The processor 202 can modify the setting 128 automatically or in response to user input. For example, the processor 202 can modify a resource allocation 126 in the distributed debugging environment 104 in response to user input. Modifying the resource allocation 126 may make the distributed debugging environment 104 more closely mimic the distributed CI environment 102 or otherwise resolve a problem that may be preventing the distributed debugging environment 104 from reproducing the failure 116.

After the distributed debugging environment 104 is modified, the distributed debugging environment 104 can run or rerun the CI pipeline 110, in an effort to reproduce the failure 116. If necessary, additional modifications can be iteratively made until the failure 116 is reproduced. In this way, the distributed debugging environment 104 can serve as an interactive and testable environment in which it may be easier to reproduce the failure 116 than, for example, the local machine of a developer.

To allow a user 112 to engage with the distributed debugging environment 104, in some examples the processor 202 can generate credentials 130 for the user 112. The user 112 may be associated with the code submission 114 (e.g., the software developer that created the code submission 114) or may be another user, such as a debugging engineer. The user 112 can access and use the distributed debugging environment 104 to determine a source of the failure 116.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, various examples described herein can be combined together to yield further examples.

What is claimed is:

1. A non-transitory computer-readable medium comprising program code that is executable by a processor for causing the processor to:
   detect a failure of a continuous integration (CI) pipeline in relation to a code submission for a software project, the CI pipeline being performed in a distributed CI environment including a plurality of CI nodes;
   in response to detecting the failure, determine a configuration of the distributed CI environment;

generate a distributed debugging environment based on the configuration of the distributed CI environment, the distributed debugging environment including a plurality of debugging nodes that are separate from the plurality of CI nodes; and modify a configuration setting of the distributed debugging environment for use in determining a source of the failure of the CI pipeline with respect to the code submission.

2. The non-transitory computer-readable medium of claim 1, further comprising program code that is executable by the processor for causing the processor to:

modify the configuration setting of the distributed debugging environment by modifying a resource allocation in the distributed debugging environment, the resource allocation being associated with the failure of the CI pipeline; and subsequent to modifying the resource allocation in the distributed debugging environment, run the CI pipeline in the distributed debugging environment to test the code submission in the distributed debugging environment.

3. The non-transitory computer-readable medium of claim 1, further comprising program code that is executable by the processor for causing the processor to:

receive an indication that the source of the failure of the CI pipeline is a constraint on a computing resource in the distributed CI environment; and in response to receiving the indication, allocate a debugging node of the plurality of debugging nodes from the distributed debugging environment to the distributed CI environment for increasing an amount of the computing resource that is available in the distributed CI environment to prevent a subsequent failure of the CI pipeline.

4. The non-transitory computer-readable medium of claim 1, further comprising program code that is executable by the processor for causing the processor to:

in response to detecting the failure, identify a user associated with the failure of the CI pipeline;

generate, for the user, credentials for accessing the distributed debugging environment; and transmit the credentials to the user.

5. The non-transitory computer-readable medium of claim 1, wherein the distributed debugging environment is configured to mimic the distributed CI environment.

6. The non-transitory computer-readable medium of claim 1, wherein the program code is further executable by the processor for causing the processor to:

determine the configuration of the distributed CI environment by detecting configuration characteristics of the plurality of CI nodes, the configuration characteristics comprising processor characteristics, memory characteristics, storage characteristics, network characteristics, and software characteristics associated with the plurality of CI nodes;

determine target configuration characteristics for the plurality of debugging nodes based on the configuration characteristics of the plurality of CI nodes; and configure the distributed debugging environment to have the target configuration characteristics.

7. The non-transitory computer-readable medium of claim 1, wherein the plurality of CI nodes has a first computing power and the plurality of debugging nodes has a second computing power, and wherein the first computing power is greater than the second computing power.

8. A method comprising:

detecting, by a processor, a failure of a continuous integration (CI) pipeline in relation to a code submission for a software project, the CI pipeline being performed in a distributed CI environment including a plurality of CI nodes;

in response to detecting the failure, determining, by the processor, a configuration of the distributed CI environment;

generating, by the processor, a distributed debugging environment based on the configuration of the distributed CI environment, the distributed debugging environment including a plurality of debugging nodes that are separate from the plurality of CI nodes; and modifying, by the processor, a configuration setting of the distributed debugging environment for use in determining a source of the failure of the CI pipeline with respect to the code submission.

9. The method of claim 8, further comprising:

modifying the configuration setting of the distributed debugging environment by modifying a resource allocation in the distributed debugging environment, the resource allocation being associated with the failure of the CI pipeline; and subsequent to modifying the resource allocation in the distributed debugging environment, running the CI pipeline in the distributed debugging environment to test the code submission in the distributed debugging environment.

10. The method of claim 8, further comprising:

receiving an indication that the source of the failure of the CI pipeline is a constraint on a computing resource in the distributed CI environment; and in response to receiving the indication, allocating a debugging node of the plurality of debugging nodes from the distributed debugging environment to the distributed CI environment for increasing an amount of the computing resource that is available in the distributed CI environment to prevent a subsequent failure of the CI pipeline.

11. The method of claim 8, further comprising:

in response to detecting the failure, identifying a user associated with the failure of the CI pipeline;

generating, for the user, credentials for accessing the distributed debugging environment; and transmitting the credentials to the user.

12. The method of claim 8, wherein the distributed debugging environment is configured to mimic the distributed CI environment.

13. The method of claim 8, further comprising:

determining the configuration of the distributed CI environment by detecting configuration characteristics of the plurality of CI nodes, the configuration characteristics comprising processor characteristics, memory characteristics, storage characteristics, network characteristics, and software characteristics associated with the plurality of CI nodes;

determining target configuration characteristics for the plurality of debugging nodes based on the configuration characteristics of the plurality of CI nodes; and configuring the distributed debugging environment to have the target configuration characteristics.

14. The method of claim 8, wherein the plurality of CI nodes has a first computing power and the plurality of debugging nodes has a second computing power, and wherein the first computing power is greater than the second computing power.

15. A system comprising:
a processor; and
a non-transitory computer-readable memory comprising instructions that are executable by the processor for causing the processor to:
  detect a failure of a continuous integration (CI) pipeline in relation to a code submission for a software project, the CI pipeline being performed in a distributed CI environment including a plurality of CI nodes;
  in response to detecting the failure, determine a configuration of the distributed CI environment;
  generate a distributed debugging environment based on the configuration of the distributed CI environment, the distributed debugging environment including a plurality of debugging nodes that are separate from the plurality of CI nodes; and
  modify a configuration setting of the distributed debugging environment for use in determining a source of the failure of the CI pipeline with respect to the code submission.

16. The system of claim 15, wherein the instructions are further executable by the processor for causing the processor to:
  modify the configuration setting of the distributed debugging environment by modifying a resource allocation in the distributed debugging environment, the resource allocation being associated with the failure of the CI pipeline; and
  subsequent to modifying the resource allocation in the distributed debugging environment, run the CI pipeline in the distributed debugging environment to test the code submission in the distributed debugging environment.

17. The system of claim 15, wherein the instructions are further executable by the processor for causing the processor to:
  receive an indication that the source of the failure of the CI pipeline is a constraint on a computing resource in the distributed CI environment; and
  in response to receiving the indication, allocate a debugging node of the plurality of debugging nodes from the distributed debugging environment to the distributed CI environment for increasing an amount of the computing resource that is available in the distributed CI environment to prevent a subsequent failure of the CI pipeline.

18. The system of claim 15, wherein the instructions are further executable by the processor for causing the processor to:
  in response to detecting the failure, identify a user associated with the failure of the CI pipeline;
  generate, for the user, credentials for accessing the distributed debugging environment; and
  transmit the credentials to the user.

19. The system of claim 15, wherein the distributed debugging environment is configured to mimic the distributed CI environment.

20. The system of claim 15, wherein the instructions are further executable by the processor for causing the processor to:
  determine the configuration of the distributed CI environment by detecting configuration characteristics of the plurality of CI nodes, the configuration characteristics comprising processor characteristics, memory characteristics, storage characteristics, network characteristics, and software characteristics associated with the plurality of CI nodes;
  determine target configuration characteristics for the plurality of debugging nodes based on the configuration characteristics of the plurality of CI nodes; and
  configure the distributed debugging environment to have the target configuration characteristics.

* * * * *